(12) United States Patent
Ogino et al.

(10) Patent No.: US 12,719,130 B2
(45) Date of Patent: Aug. 25, 2026

(54) POWER STORAGE MODULE

(71) Applicant: Panasonic Intellectual Property Management Co., Ltd., Osaka (JP)

(72) Inventors: Hirotaka Ogino, Osaka (JP); Koichi Sawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 690 days.

(21) Appl. No.: 17/755,314

(22) PCT Filed: Oct. 23, 2020

(86) PCT No.: PCT/JP2020/040010
§ 371 (c)(1),
(2) Date: Apr. 26, 2022

(87) PCT Pub. No.: WO2021/085351
PCT Pub. Date: May 6, 2021

(65) Prior Publication Data
US 2022/0367967 A1 Nov. 17, 2022

(30) Foreign Application Priority Data
Oct. 31, 2019 (JP) ................................ 2019-199219

(51) Int. Cl.
*H01M 10/615* (2014.01)
*H01M 10/6554* (2014.01)
(Continued)

(52) U.S. Cl.
CPC ..... *H01M 50/3425* (2021.01); *H01M 10/615* (2015.04); *H01M 10/657* (2015.04); *H01M 10/658* (2015.04)

(58) Field of Classification Search
CPC ........... H01M 10/657; H01M 10/6571; H01M 50/3425; H01M 10/615; H01M 10/658;
(Continued)

(56) References Cited

U.S. PATENT DOCUMENTS 8,241,772 B2 * 8/2012 Hermann ............. H01M 10/42 429/61
8,426,048 B2 * 4/2013 Fujikawa ............. H01M 50/30 429/57
(Continued)

FOREIGN PATENT DOCUMENTS

CN 106701012 A * 5/2017 ............ C09J 183/04
CN 209071461 U 7/2019
(Continued)

OTHER PUBLICATIONS

Translation of CN110148692A (Year: 2019).*
(Continued)

*Primary Examiner* — Jeffrey T Barton
*Assistant Examiner* — Gigi Lee Lin
(74) *Attorney, Agent, or Firm* — Rimon P.C.

(57) ABSTRACT

A power storage module includes a plurality of power storage devices and a heater that heats the plurality of power storage devices. Each of the plurality of power storage devices includes an exhaust valve that discharges a gas in the power storage device to an outside of the power storage device. The heater faces the exhaust valve. The power storage module further includes a case that houses the plurality of power storage devices and the heater, and an exhaust duct that is formed on an upper side of an inside of the case and communicates with an outside of the case.

25 Claims, 7 Drawing Sheets

(51) Int. Cl.

| | |
|---|---|
| ***H01M 10/6566*** | (2014.01) |
| ***H01M 10/657*** | (2014.01) |
| ***H01M 10/6571*** | (2014.01) |
| ***H01M 10/658*** | (2014.01) |
| ***H01M 50/213*** | (2021.01) |
| ***H01M 50/264*** | (2021.01) |
| ***H01M 50/342*** | (2021.01) |
| ***H01M 50/35*** | (2021.01) |
| ***H01M 50/569*** | (2021.01) |

(58) Field of Classification Search

CPC .......... H01M 10/6554; H01M 10/643; H01M 50/342; H01M 50/35; H01M 50/213; H01M 10/486; H01M 10/6566; H01M 50/264; H01M 50/569; H01M 10/48; H01M 50/20; Y02E 60/10

See application file for complete search history.

(56) References Cited

U.S. PATENT DOCUMENTS

| | | | | |
|---|---|---|---|---|
| 2003/0180584 | A1 | 9/2003 | Suzuki et al. | |
| 2012/0021260 | A1 | 1/2012 | Yasui et al. | |
| 2016/0285140 | A1* | 9/2016 | Kimura | H01M 10/6562 |
| 2017/0113556 | A1 | 4/2017 | Nakamura | |
| 2018/0212222 | A1* | 7/2018 | Barton | H01M 50/3425 |
| 2018/0233723 | A1* | 8/2018 | Morioka | H01M 50/271 |
| 2018/0351069 | A1 | 12/2018 | Boukai et al. | |
| 2020/0212526 | A1* | 7/2020 | Wu | H01M 50/30 |
| 2021/0328303 | A1* | 10/2021 | Hou | H01M 10/613 |
| 2022/0336885 | A1* | 10/2022 | Carpenter | H01M 10/615 |
| 2023/0344069 | A1* | 10/2023 | Doak | H01M 50/143 |

FOREIGN PATENT DOCUMENTS

| | | | | | |
|---|---|---|---|---|---|
| CN | 110148692 | A | * | 8/2019 | H01M 10/486 |
| DE | 102008059971 | A1 | * | 6/2010 | H01M 50/278 |
| EP | 3675218 | A1 | | 7/2020 | |
| EP | 3890052 | A1 | | 10/2021 | |
| JP | 3804543 | B2 | | 8/2006 | |
| JP | 5086496 | B2 | * | 11/2012 | H01M 10/0431 |
| JP | 2013-254637 | | | 12/2013 | |
| JP | 2018-129251 | | | 8/2018 | |
| KR | 10-1283660 | B1 | | 7/2013 | |
| WO | WO-2011092773 | A1 | * | 8/2011 | H01M 10/613 |
| WO | 2020/133751 | A1 | | 7/2020 | |

OTHER PUBLICATIONS

Translation of CN106701012A (Year: 2017).*

Translation of WO 2011092773 A1 (Year: 2011).*

DE-102008059971-A1 translation (Year: 2010).*

JP-5086496-B2 translation (Year: 2012).*

Indian Examination Report dated Sep. 14, 2022 for the related Indian Patent Application No. 202247030029.

The EPC Office Action dated May 19, 2023 for the related European Patent Application No. 20883540.5.

International Search Report of PCT application No. PCT/JP2020/040010 dated Dec. 28, 2020.

The Indian OA dated Jan. 14, 2025 for the related Indian Patent Application No. 202247030029.

* cited by examiner

POWER STORAGE MODULE

TECHNICAL FIELD

The present disclosure relates to a power storage module including a plurality of power storage devices.

BACKGROUND ART

Conventionally, a power storage module including a plurality of power storage devices is known. For example, PTL 1 discloses a power storage module including a plurality of power storage devices, holding blocks constituting side surfaces of each of the plurality of power storage devices, and a heater attached to one of the holding blocks facing each other. The heater heats the power storage device to an appropriate temperature when starting the power storage device at a low temperature, for example.

CITATION LIST

Patent Literature

PTL 1: Unexamined Japanese Patent Publication No. 2013-254637

SUMMARY OF THE INVENTION

However, in the power storage module disclosed in PTL 1, since the heater is attached to the side surface of the power storage module, heat dissipation to an outside of the power storage module is large. Therefore, the heating efficiency of the heater when the power storage device is heated is lowered.

An object of the present disclosure is to provide a power storage module capable of improving heating efficiency of a heater for heating a power storage device.

A power storage module according to one aspect of the present disclosure includes: a plurality of power storage devices; and a heater that heats the plurality of power storage devices, wherein each of the plurality of power storage devices includes an exhaust unit that discharges a gas in the power storage device to an outside of the power storage device, and the heater faces the exhaust unit.

According to one aspect of the present disclosure, the heating efficiency of the heater for heating the power storage device can be improved.

DESCRIPTION OF EMBODIMENT

Hereinafter, an exemplary embodiment of the present disclosure will be described with reference to the drawings. The shape, material, and number described below are examples for description, and can be appropriately changed according to the specification of a power storage module. In the following description, the same elements are denoted by the same reference marks in all the drawings.

Figure 1:
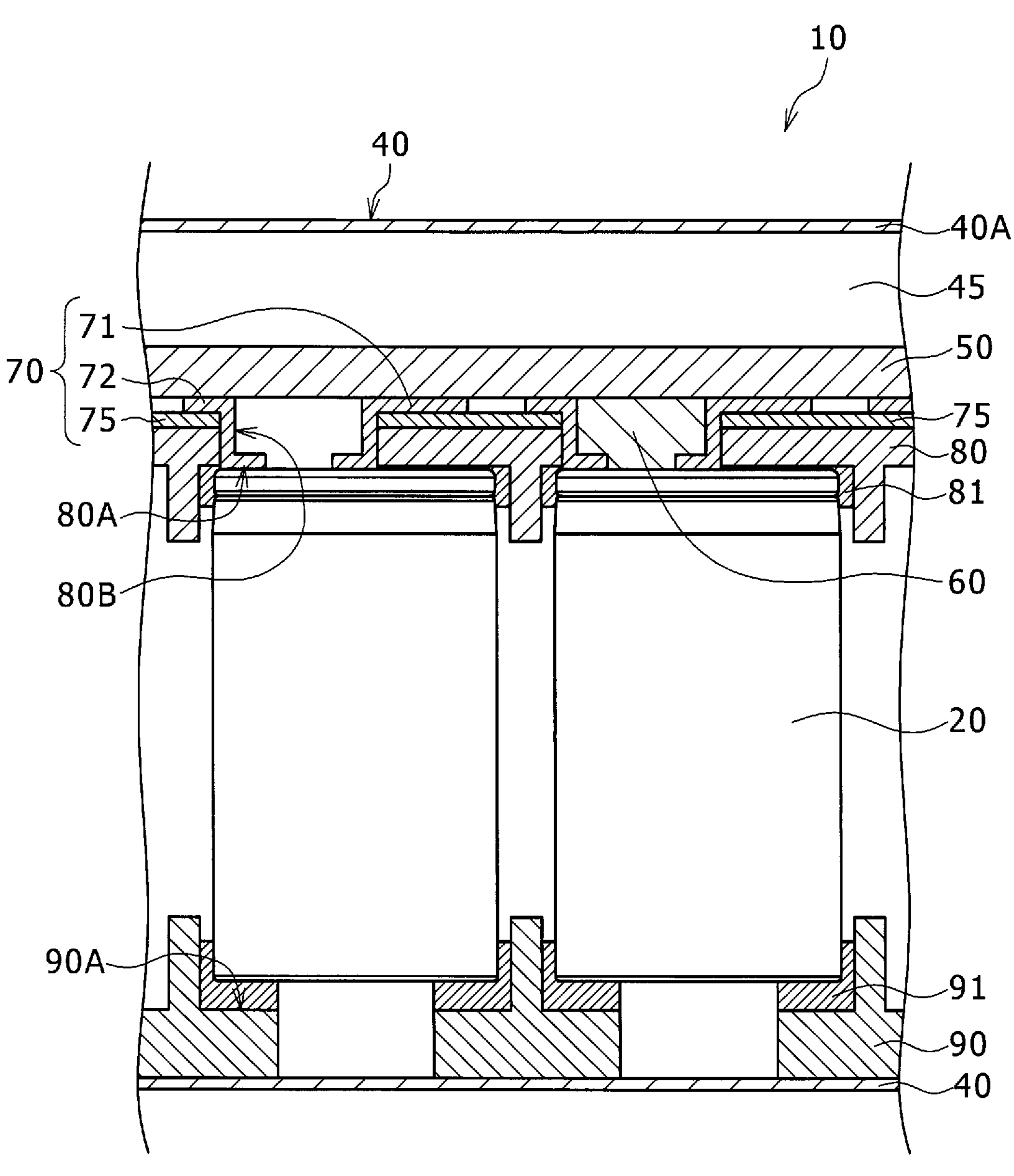
FIG. 1 is a side sectional view illustrating a power storage module which is an example of an exemplary embodiment.

Power storage module 10 which is an example of the exemplary embodiment will be described with reference to FIG. 1. FIG. 1 is a side sectional view illustrating power storage module 10.

Power storage module 10 is mainly used as a power source for power. Power storage module 10 is used as a power source of an electrically powered device driven by a motor such as an electrically powered tool, an electrically powered assisted bicycle, an electrically powered motorcycle, an electrically powered wheelchair, an electrically powered tricycle, or an electrically powered cart, for example. However, the application of power storage module 10 is not limited, and the power storage module may be used as a power source for various electric devices used indoors and outdoors, such as electric devices other than the electrically powered devices, for example, cleaners, wireless devices, lighting devices, digital cameras, and video cameras.

Power storage module 10 includes a plurality of cylindrical power storage devices 20, heater 50 that heats the plurality of power storage devices 20, case 40 as a housing that houses the plurality of power storage devices 20 and heater 50, exhaust duct 45 that is formed on an upper part of an inside of case 40 and communicates with an outside of case 40, heat conductive material 60 that conducts heat of heater 50 to power storage devices 20, current collector plate 70 that electrically connects the plurality of power storage devices 20, upper holder 80 that holds upper end parts of the plurality of power storage devices 20, and lower holder 90 that holds lower end parts of the plurality of power storage devices 20.

The plurality of power storage devices 20 are densely filled in power storage module 10, and adjacent power storage devices 20 are arranged. For example, a plurality of rows may be formed such that the plurality of power storage devices 20 form a zigzag shape. When a gas in power storage devices 20 increases and a pressure in power storage devices 20 increases (hereinafter, this state is also referred to as an abnormal state of power storage devices 20), power storage devices 20 discharge the gas generated from an inside of power storage devices 20 or an emission matter (for example, a stored object such as an electrolyte solution or a solid in power storage devices 20) to an outside of power storage devices 20 (for example, upwards above power storage devices 20 in FIG. 1). Details of each of power storage devices 20 will be described later. Hereinafter, the discharge of the gas accumulated in the inside of power storage device 20 in an abnormal state is also referred to as exhaust.

When power storage device 20 is abnormal, exhaust duct 45 discharges the gas in power storage device 20 to the outside of case 40. Exhaust duct 45 is a duct formed by upper side part 40A of case 40 positioned above heater 50, and upper holder 80. Exhaust duct 45 has an air outlet (not illustrated) communicating with the outside of case 40. Although exhaust duct 45 of the present exemplary embodiment is a duct formed of upper side part 40A and upper holder 80, the present invention is not limited thereto. As the exhaust duct, it is sufficient that a space communicating with the outside of case 40 is provided on a side where power storage device 20 is exhausted.

Exhaust duct 45 communicates with the inside of power storage device 20 because heater 50 and heat conductive material 60 burst when power storage device 20 exhausts a gas. With such a configuration, exhaust duct 45 can exhaust a gas which is present in the inside of power storage device 20 to the outside.

Heater 50 heats power storage device 20 to an appropriate temperature when starting power storage device 20 at a low temperature, for example. Heater 50 is disposed on a bottom surface of exhaust duct 45 inside exhaust duct 45. Heater 50 is disposed above upper holder 80 via current collector plate 70. Further, heater 50 is disposed on above power storage device 20 via heat conductive material 60. When power storage device 20 exhausts a gas, heater 50 ruptures due to a pressure of the exhausted gas. Details of heater 50 will be described later.

According to the configuration of heater 50, above heater 50, air in upper side part 40A of case 40 and exhaust duct 45 is prevented from releasing heat generated by heater 50 in a direction other than a heat transfer path to power storage device 20. That is, above heater 50, the internal air of upper side part 40A of case 40 and exhaust duct 45 functions as a heat insulating material. With such a configuration, when heater 50 heats power storage device 20, heat dissipation to the outside of case 40 is reduced compared to a configuration where heater 50 is brought into contact with air in an opened space. On the other hand, below heater 50, heat conductive material 60 promotes heat conduction of heater 50. Therefore, when heater 50 heats power storage device 20, power storage device 20 can be heated to an appropriate temperature in a short time. Further, it is also possible to reduce a loss of energy required to heat power storage device 20 to a predetermined temperature. As described above, in case 40, an outlet part of exhaust duct 45 may be sealed when power storage device 20 is in a normal state. With this configuration, the heat insulating effect between the air inside exhaust duct 45 and the air outside case 40 is enhanced, so that the heating efficiency of heater 50 is further enhanced. Note that when the exhaust part of power storage device 20 is provided near a bottom of an outer covering can, heater 50 may be disposed on a lower side of power storage module 10 such that the exhaust part near the bottom and heater 50 face each other. Further, heater 50 may include a pair of heaters 50 disposed with power storage device 20 interposed therebetween.

Heat conductive material 60 conducts heat generated by heater 50 to power storage device 20 when power storage device 20 is heated to an appropriate temperature by heater 50. That is, heater 50 and power storage device 20 are thermally connected to each other through heat conductive material 60. Heat conductive material 60 has an insulating property. Heat conductive material 60 is accommodated between heater 50 and power storage device 20 in opening 80B of upper holder 80. When power storage device 20 sprays a gas, heat conductive material 60 is ruptured by a pressure of the gas. As heat conductive material 60, for example, silicone as a two-liquid curable material, silicone in a paste form, or urethane as a two-liquid curable material containing metal oxide (for example, aluminum oxide, zinc oxide), metal nitride (for example, aluminum nitride, boron nitride), metal oxynitride (for example, aluminum oxynitride), or the like is used.

Current collector plate 70 has, for example, a plate shape including insulating substrate 75, positive electrode current collector member 71 (first current collector member) disposed on insulating substrate 75 and connected to a positive-electrode terminal, and negative electrode current collector member 72 (second current collector member) connected to a negative-electrode terminal. Current collector plate 70 may be disposed such that insulating substrate 75 faces upper holder 80. Each of positive electrode current collector member 71 and negative electrode current collector member 72 is a metal sheet, and has a current collector lead for electrical connection from an edge of the metal sheet to each terminal. Each current collector lead extends to each power storage device 20 through opening 80B of upper holder 80. Positive electrode current collector member 71 and negative electrode current collector member 72 may be disposed side by side in a direction of a main surface of insulating substrate 75. Further, a gap may be formed between positive electrode current collector member 71 and negative electrode current collector member 72. Current collector plate 70 is provided between heater 50 and upper holder 80. As current collector plate 70, a material having good electrical conduction and thermal conduction is used, and an iron plate whose surface is plated with nickel or the like, a metal sheet plate such as a nickel plate, a copper plate, or an aluminum plate is used. Note that, in power storage module 10, the current collector plate which performs a function of positive electrode current collector member 71 and the current collector plate which performs a function of negative electrode current collector member 72 may be separated from each other, one of the current collector plates may be disposed near a sealing body of power storage device 20 and electrically connected to sealing body 32, and the other current collector plate may be disposed near a bottom of outer covering can 31 (see FIG. 2) of power storage device 20 and electrically connected to outer covering can 31. In this case, opening 90B of lower holder 90 may be filled with heat conductive material 60.

Upper holder 80 holds upper end parts of the plurality of arranged power storage devices 20. On a lower surface part of upper holder 80, container 80A in which an upper end part of each of power storage devices 20 is housed is formed. Opening 80B that communicates an outer surface (upper surface) of upper holder 80 and container 80A is formed in container 80A of upper holder 80, and heat conductive material 60 is accommodated therein. Upper holder 80 is made of a thermoplastic resin, a thermosetting resin or the like as an insulating material. Holding material 81 is provided between container 80A of upper holder 80 and the lower end part of power storage device 20. As holding material 81, an epoxy-based adhesive, a silicone-based elastic adhesive, or the like is used. Upper holder 80 may be made of metal such as aluminum or iron as long as insulation from power storage device 20 and current collector plate 70 can be secured.

Lower holder 90 holds lower end parts of the plurality of arranged power storage devices 20. On an upper surface part of lower holder 90, container 90A in which a lower end part of each of power storage devices 20 is housed is formed. Lower holder 90 is made of a thermoplastic resin, a thermosetting resin, or the like as an insulating material. Holding material 91 is provided between container 90A of lower holder 90 and the lower end part of power storage device 20. As holding material 91, an epoxy-based adhesive, a silicone-based elastic adhesive, or the like is used. Lower holder 90 may be made of metal such as aluminum or iron as long as insulation from power storage device 20 and current collector plate 70 can be secured.

Figure 2:
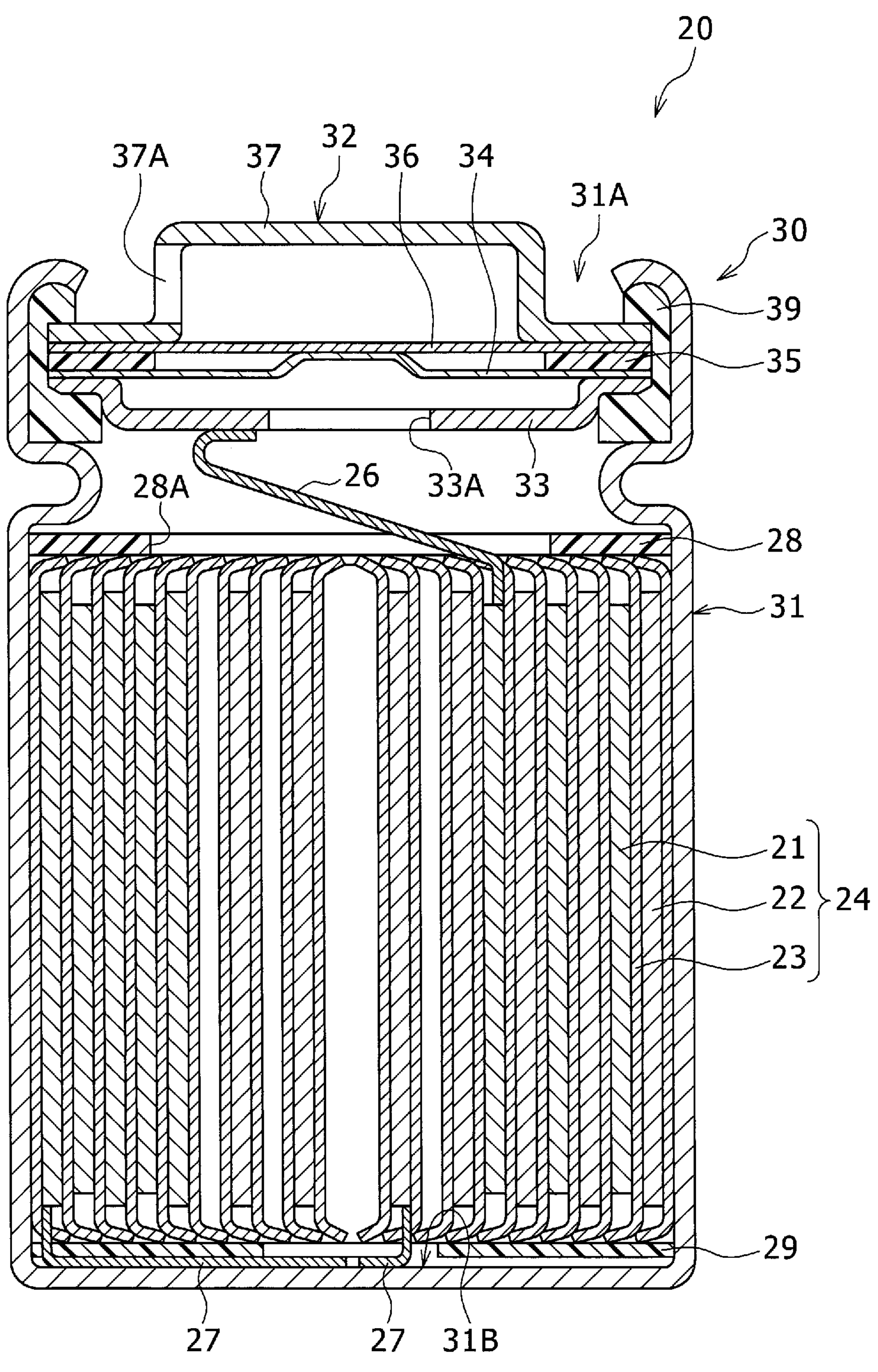
FIG. 2 is a side sectional view illustrating a power storage device which is an example of the exemplary embodiment.

Power storage device 20 will be described with reference to FIG. 2. FIG. 2 is a side sectional view illustrating power storage device 20.

As power storage device 20, a cylindrical lithium ion secondary battery is used. Note that power storage device 20 may be a nickel metal hydride battery or a capacitor in addition to the lithium ion secondary battery. Power storage device 20 is configured by accommodating electrode group 24 and an electrolyte solution in battery case 30. Battery case 30 includes cylindrical outer covering can 31 and sealing body 32 that insulates and seals outer covering can 31.

Electrode group 24 is configured by spirally winding positive electrode 21 as a strip-shaped first electrode and negative electrode 22 as a strip-shaped second electrode with strip-shaped separator 23 interposed therebetween. In electrode group 24, positive electrode 21, negative electrode 22, and separator 23 are alternately stacked in a radial direction of electrode group 24. Insulating plates 28 and 29 are provided above and below electrode group 24 (both ends of electrode group 24 in a winding axis direction), respectively.

Positive electrode 21 is electrically connected to sealing body 32 (positive-electrode terminal) by positive electrode lead 26. Positive electrode lead 26 is connected to positive electrode 21, extends from an upper end of electrode group 24, passes through through-hole 28A of insulating plate 28, and is welded to a lower surface of filter 33 of sealing body 32.

Negative electrode 22 is electrically connected to outer covering can 31 (negative-electrode terminal) by negative electrode lead 27. Negative electrode lead 27 is provided, for example, at a winding inner end part and a winding outer end part of electrode group 24, extends from a lower end of electrode group 24, and is welded to bottom part 31B of outer covering can 31.

The electrolyte solution contains a non-aqueous solvent and an electrolyte salt dissolved in the non-aqueous solvent. The non-aqueous electrolyte is not limited to a liquid electrolyte, and may be in a gel state or a solid state.

Outer covering can 31 is a metal container formed in a cylindrical shape having opening 31A on an upper end. Outer covering can 31 houses electrode group 24 and the non-aqueous electrolyte. Outer covering can 31 is electrically connected to negative electrode 22 as described above. Outer covering can 31 is formed by drawing and processing a metal such as aluminum, iron, steel, copper, or nickel.

Sealing body 32 closes opening 31A of outer covering can 31 together with gasket 39. Further, sealing body 32 is electrically connected to positive electrode 21 as described above. In sealing body 32, filter 33, inner cap 34, insulating member 35, exhaust valve 36, and cap 37 are stacked in this order from electrode group 24. Each member constituting sealing body 32 has, for example, a disk shape or a ring shape, and the members excluding insulating member 35 are electrically connected to each other. As described above, exhaust valve 36 ruptures when the gas generated from the inside of battery case 30 reaches a predetermined pressure or more when power storage device 20 thermally runs away.

For example, when an internal short circuit or the like occurs in electrode group 24 and the internal pressure of battery case 30 increases, exhaust valve 36 swells toward cap 37, inner cap 34 and exhaust valve 36 are disconnected, and the current path between inner cap 34 and exhaust valve 36 is cut off. When the internal pressure of battery case 30 further increases, exhaust valve 36 breaks. As a result, the gas generated inside battery case 30 is discharged to the outside of battery case 30 through through-hole 33A of filter 33, the through-hole of inner cap 34, the crevice of ruptured exhaust valve 36, and open part 37A of cap 37.

Figure 3:
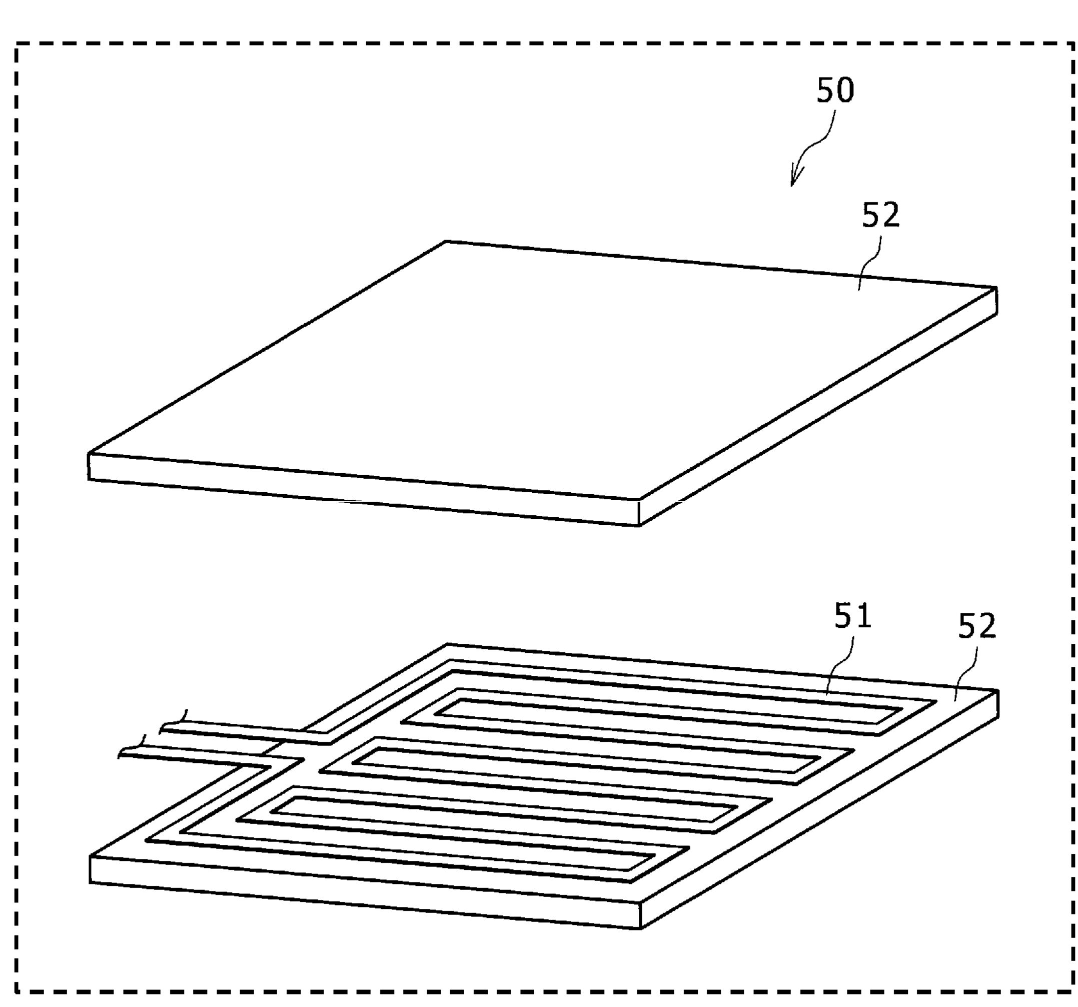
FIG. 3 is a schematic diagram illustrating a heater as an example of the exemplary embodiment.

A configuration of heater 50 will be described with reference to FIG. 3. FIG. 3 is a schematic diagram illustrating heater 50.

Heater 50 is formed in a sheet shape by providing base materials 52 above and below metal foil heater 51 as a heating element. The heating element is not limited to metal foil heater 51, and may be, for example, an electric heating wire heater.

Metal foil heater 51 is a thin sheet-like heating element that causes electricity to flow through the metal foil to generate heat. Metal foil heater 51 is formed so as to pass through all heat conductive materials 60 of power storage module 10, and heats all power storage devices 20 via heat conductive materials 60. As metal foil heater 51, one that breaks when a pressure higher than or equal to a predetermined pressure is applied from the outside is used. As metal foil heater 51, for example, aluminum, a nickel-chromium alloy, iron, chromium, an aluminum alloy, or the like is used.

Base material 52 conducts heat generated by metal foil heater 51 to the outside of heater 50. As base material 52, one that ruptures when a pressure higher than or equal to the predetermined pressure described above is applied from the outside is used. Further, base material 52 is formed of an insulating material. As base material 52, for example, a silicon rubber, a polyethylene terephthalate (PET) film, a polyimide film, or the like is used.

According to the configuration of heater 50, heater 50 ruptures when a pressure higher than or equal to a predetermined pressure is applied from the outside. As the predetermined pressure, a pressure at least lower than a pressure at which exhaust valve 36 operates is set. As a result, when exhaust valve 36 of power storage device 20 ruptures, heater 50 ruptures due to a pressure of the gas generated from the inside of battery case 30. In this manner, when power storage device 20 is abnormal, the inside of power storage device 20 and exhaust duct 45 communicate with each other, and an exhaust path is secured.

Further, when power storage device 20 discharges the exhaust gas, an emission matter may be discharged together with the gas. This emission matter is often a conductive and highly heated object such as fragments of positive electrode 21, negative electrode 22, the lead, and the like housed in battery case 30, or an electrolyte solution. Furthermore, when vibration is applied to discharged power storage device 20 after the discharge from power storage device 20 is finished, the emission matter may jump out through the ruptured part of exhaust valve 36. According to the configuration of heater 50, since base material 52 is formed of an insulating material, when these emission matters are jetted to exhaust duct 45, the passing emission matters and current collector plate 70 of another power storage device 20 are easily electrically insulated by heater 50. In addition, since base material 52 has heat resistance so as to withstand a temperature rise of metal foil heater 51, even when base material 52 comes into contact with a high-temperature emission matter, holes are hardly formed in base material 52, or the base material is hardly torn. Accordingly, current collector plate 70 is hardly short-circuited. This effect is particularly effective when positive electrode current collector member 71 and negative electrode current collector member 72 in current collector plate 70 are collectively disposed at one place in power storage module 10. In current collector plate 70, positive electrode current collector member 71 and negative electrode current collector member 72 are disposed with a gap therebetween. Therefore, when heater 50 is disposed so as to cover the gap, a short circuit of current collector plate 70 is effectively suppressed. By suppressing the short circuit in this manner, it is possible to suppress normal power storage device 20 from being affected by abnormal power storage device 20 and falling into an abnormal state.

Figure 4:
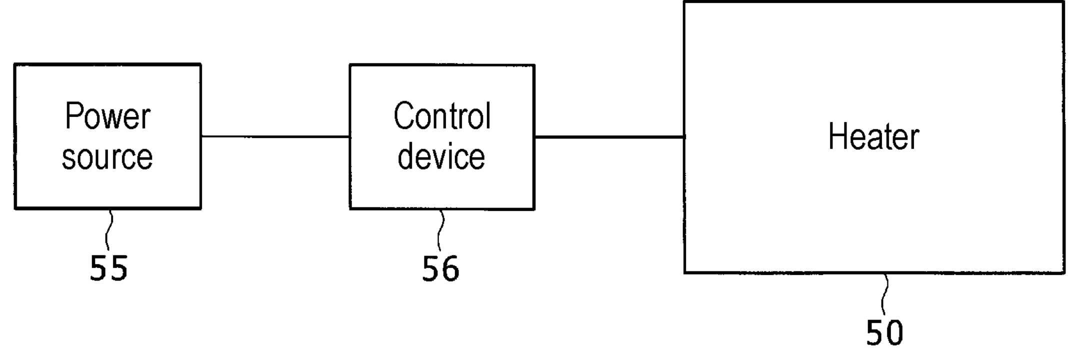
FIG. 4 is a block diagram illustrating a control configuration of the heater according to an example of the exemplary embodiment.

A control configuration of heater 50 will be described with reference to FIG. 4. FIG. 4 is a block diagram illustrating the control configuration of heater 50.

Heater 50 is connected to power source 55 that supplies electric power, and control device 56 that controls the supply of electric power and detects breakage of heater 50.

Power source 55 supplies electric power to metal foil heater 51 of heater 50. As power source 55, power storage module 10 may be used. Further, an electric device on which power storage module 10 is mounted or another power source of the electric device may be used.

Control device 56 has a function of controlling supply of electric power to metal foil heater 51 such that power storage device 20 is at an appropriate temperature by, for example, a temperature sensor provided in the vicinity of power storage device 20. Further, for example, control device 56 can detect that a resistance value of metal foil heater 51 becomes infinite, and can detect that the supply of the electric power to metal foil heater 51 is interrupted. As a result, control device 56 can detect that heater 50 has ruptured. That is, control device 56 can detect that at least one power storage device 20 is in an abnormal state in power storage module 10.

Figure 5:
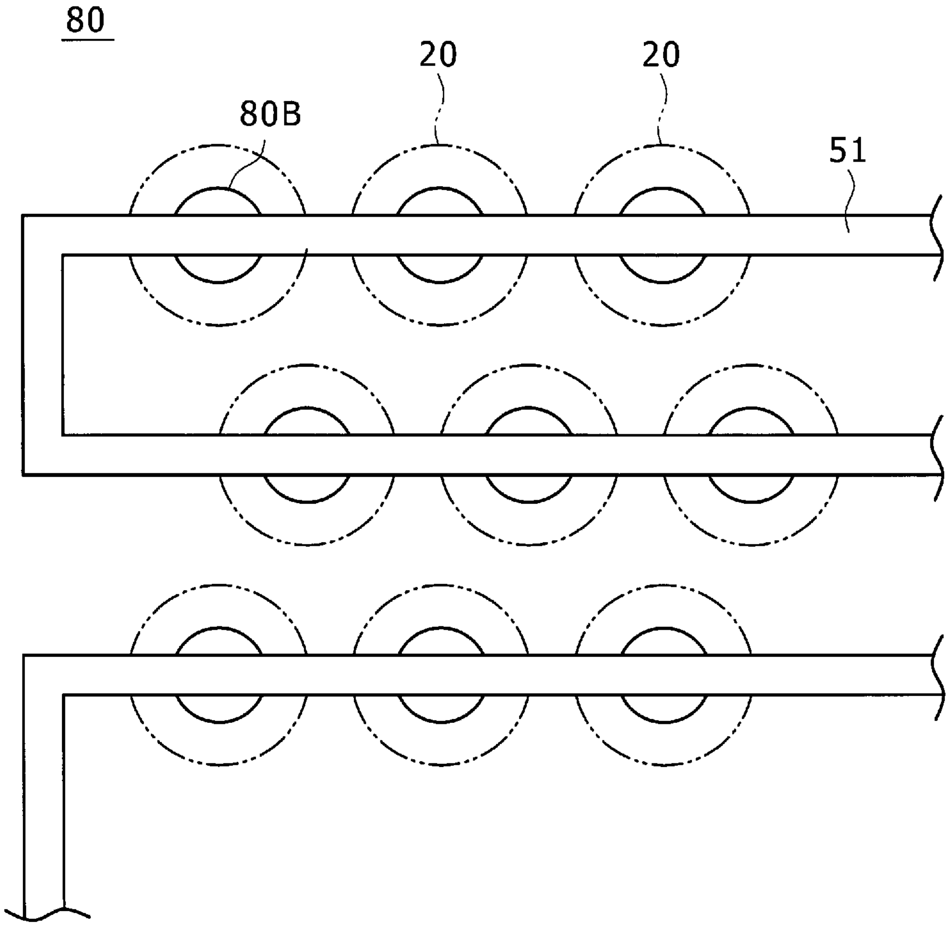
FIG. 5 is a schematic diagram illustrating an arrangement of the heater and the power storage device.

An arrangement of heater 50 and power storage devices 20 will be described with reference to FIG. 5. FIG. 5 is a schematic view illustrating the arrangement of heater 50 and power storage devices 20.

As illustrated in FIG. 5, a part of metal foil heater 51 may face opening 80B of upper holder 80 in order to more reliably rupture metal foil heater 51 when power storage device 20 exhausts a gas.

Further, in metal foil heater 51, a part not overlapping opening 80B may be more firmly fixed than a part overlapping opening 80B. Therefore, heater 50 may be fixed to case 40 or upper holder 80 at this non-overlapping part.

Figure 6:
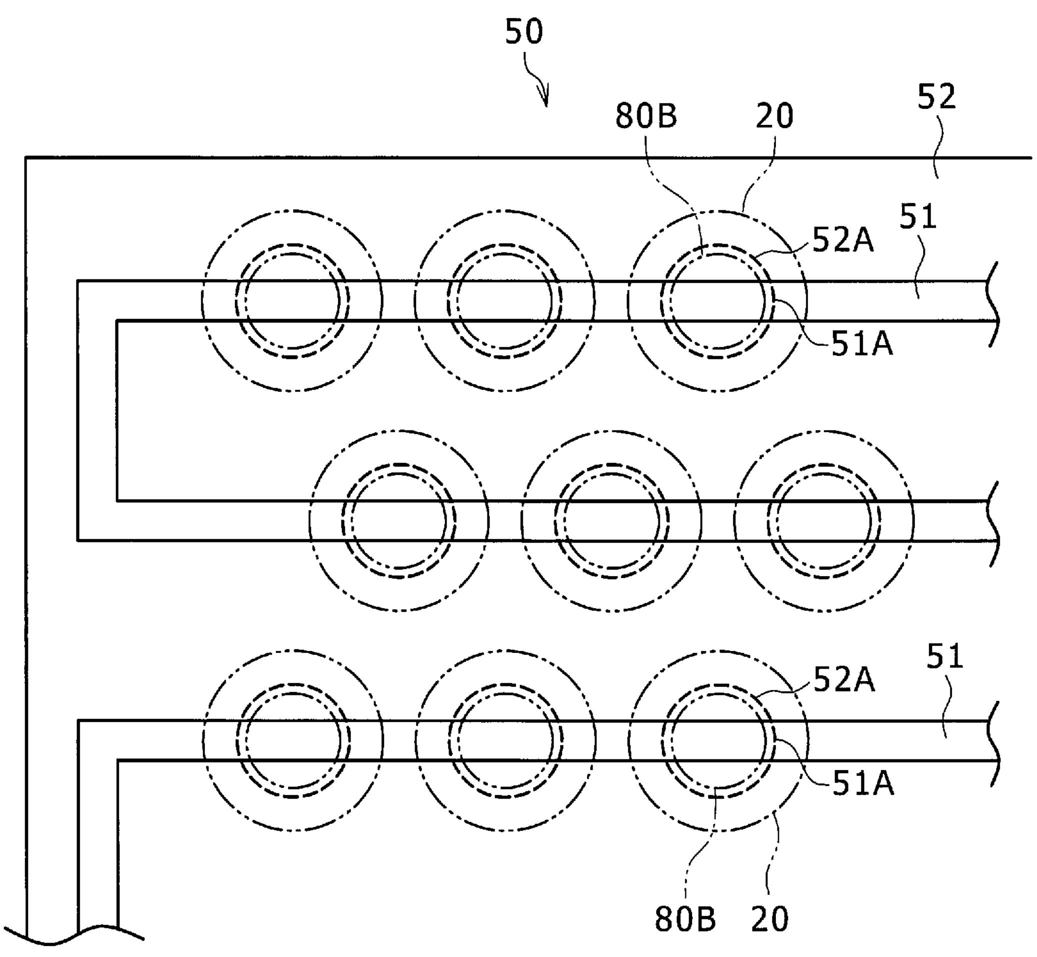
FIG. 6 is a schematic diagram illustrating a heater according to another example of the exemplary embodiment.
Figure 7:
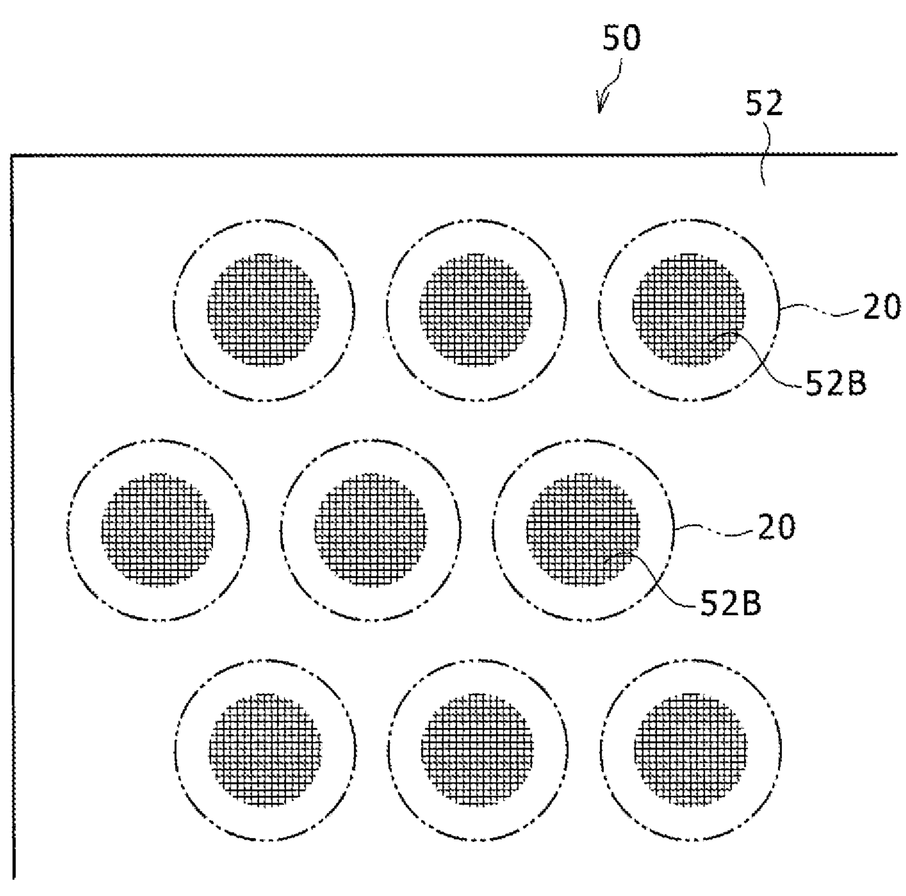
FIG. 7 is a schematic diagram illustrating a heater according to another example of the exemplary embodiment.

A configuration of heater 50 according to another example of the exemplary embodiment will be described with reference to FIGS. 6 and 7. FIGS. 6 and 7 are schematic diagrams illustrating heater 50.

As illustrated in FIG. 6, heater 50 according to another example of the exemplary embodiment may be configured such that fragile part 51A formed of, for example, a perforation or the like is formed in a part overlapping opening 80B of metal foil heater 51 so as to have mechanical strength lower than mechanical strength of other parts of metal foil heater 51. With these configurations, metal foil heater 51 is partially weakened and easily ruptures. Further, similarly, instead of metal foil heater 51, fragile part 52A such as a perforation may be formed in the vicinity of opening 80B of base material 52 so that the mechanical strength is weaker than that of other parts of base material 52, and base material 52 and metal foil heater 51 overlapping opening 80B may be ruptured simultaneously. At this time, fragile part 51A and fragile part 52A may be formed outside a peripheral edge of opening 80B. With such a configuration, an area where a region surrounded by fragile parts 51A, 52A in heater 50 is brought into contact with a gas jetted from power storage device 20 is increased, and stress applied to fragile parts 51A, 52A when the gas collides with this region is higher than that applied to heater 50 in which fragile parts 51A, 52A are in opening 80B. Therefore, heater 50 can be more reliably ruptured.

As illustrated in FIG. 7, in heater 50 which is another example of the exemplary embodiment, mesh part 52B including an infinite number of fine holes may be formed in a part overlapping with metal foil heater 51 or opening 80B of base material 52, only a gas released from power storage device 20 may pass through mesh part 52B of heater 50, and an emission matter may be blocked by the small holes of mesh part 52B. With such a configuration, it is possible to guide a gas discharged from power storage device 20 to exhaust duct 45 without rupturing heater 50.

Figure 8:
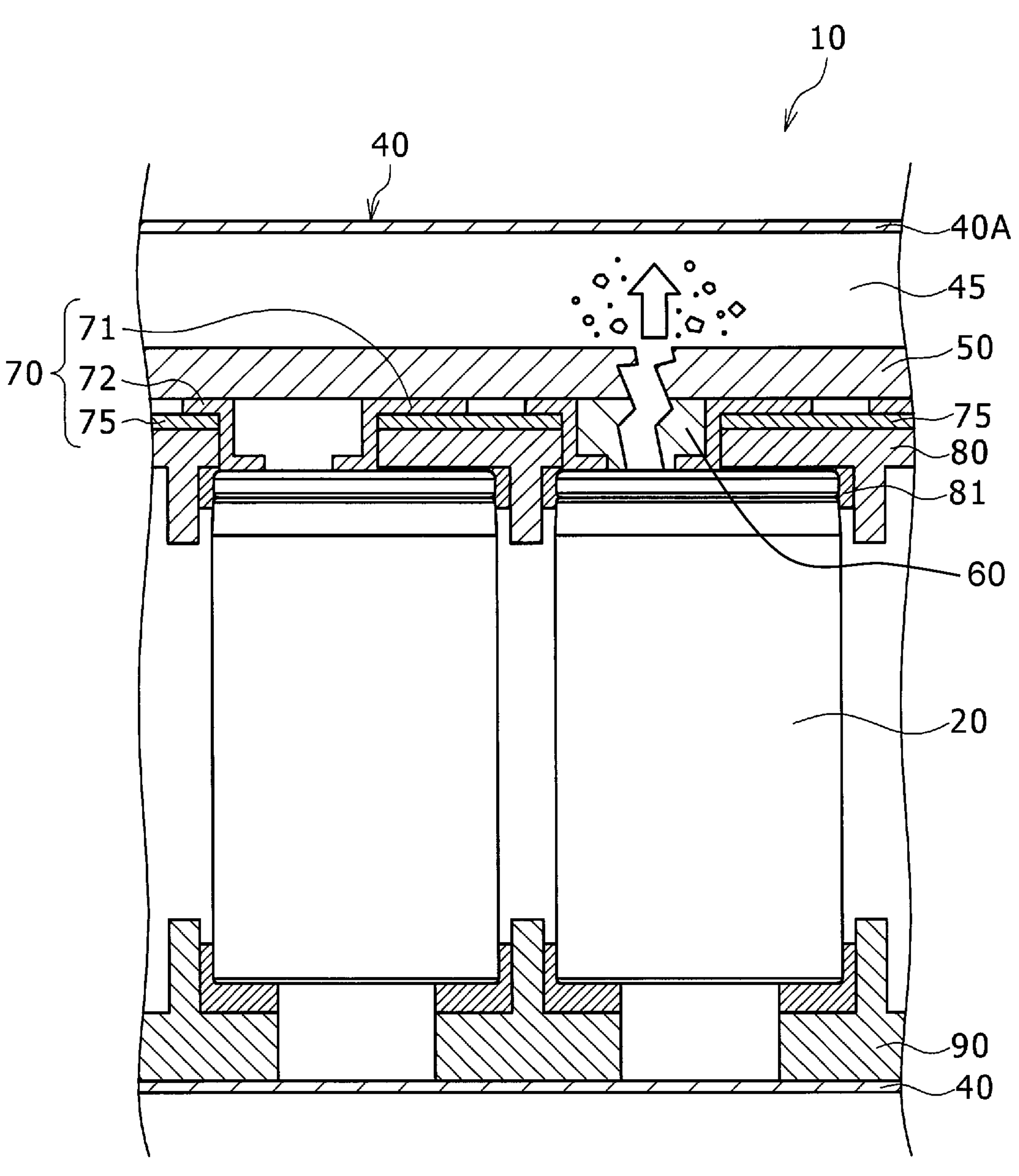
FIG. 8 is a side sectional view of the power storage module illustrating a state where a gas is generated from the power storage device.

A state in which a gas is generated from power storage device 20 will be described with reference to FIG. 8. FIG. 8 is a side sectional view illustrating power storage module 10.

In power storage device 20, a gas is generated when thermal runaway occurs or a member in power storage device 20 is deteriorated. When a gas is generated in power storage device 20, exhaust valve 36 ruptures as described above, and the gas is discharged from cap 37.

As heat conductive material 60, a material that breaks when a pressure higher than or equal to a predetermined pressure is applied from the outside is used. The predetermined pressure is set to a pressure at least lower than a pressure at which exhaust valve 36 operates. As a result, heat conductive material 60 is ruptured by the pressure of the gas ejected from power storage device 20 for rupturing exhaust valve 36. The gas discharged from power storage device 20 passes through the crevice of ruptured heat conductive material 60, and reaches heater 50.

As described above, heater 50 is ruptured by the pressure for rupturing exhaust valve 36 of the gas ejected from power storage device 20. As a result, the gas discharged from power storage device 20 passes through the crevice of ruptured heater 50, and reaches exhaust duct 45. At this time, control device 56 detects that power storage device 20 is in an abnormal state by detecting the rupture of heater 50.

Exhaust duct 45 discharges the gas discharged from power storage device 20 to the outside. In this way, in power storage module 10, when power storage device 20 is in an abnormal state, heat conductive material 60 and heater 50 are ruptured, so that the inside of power storage device 20 and exhaust duct 45 communicate with each other, and the exhaust path is secured. With such a configuration, even when heat conductive material 60 and heater 50 are disposed between power storage device 20 and exhaust duct 45, it is possible to discharge a gas or an emission matter discharged from power storage device 20 to the outside.

Effects of power storage module 10 will be described. According to power storage module 10, the heating efficiency of heater 50 for heating power storage device 20 can be improved.

That is, with the configuration in which heater 50 is provided inside exhaust duct 45, it is possible to impart a function as a heat insulating material to upper side part 40A of case 40 and the internal air of exhaust duct 45, and it is possible to reduce heat dissipation of heater 50 to the outside of power storage module 10. With such a configuration, it is possible to improve the heating efficiency of heater 50 at the time of heating power storage device 20.

Further, even when heater 50 is provided inside exhaust duct 45, it is possible to secure an exhaust path of the gas generated from power storage device 20.

That is, it is assumed that heater 50 and heat conductive material 60 rupture when a pressure higher than or equal to a predetermined pressure is applied from the outside, and the predetermined pressure is set to a pressure at least lower than the pressure at which exhaust valve 36 operates. As a result, even when exhaust valve 36 of power storage device 20 is operated and a gas is ejected from power storage device 20, heater 50 and heat conductive material 60 are ruptured by the pressure of the gas, power storage device 20 and exhaust duct 45 communicate with each other, and the gas generated from power storage device 20 is exhausted to the outside from exhaust duct 45.

Furthermore, since base material 52 constituting heater 50 is formed of an insulating material, when an emission matter generated from the inside of power storage device 20 passes through the inside of exhaust duct 45, the passing emission matter is electrically insulated from current collector plate 70 of another power storage device 20 by heater 50. This configuration prevents short circuit of current collector plate 70. Further, it is not necessary to separately provide an insulating material inside exhaust duct 45, and the number of parts can be reduced.

Furthermore, since base material 52 constituting heater 50 is formed of an insulating material, when an emission matter generated from the inside of power storage device 20 passes through the inside of exhaust duct 45, the passing emission matter and another normal power storage device 20 are easily electrically insulated by heater 50. Therefore, even when one power storage device 20 becomes abnormal, it is possible to prevent a short circuit with another power storage device 20. With such a configuration, it is possible to prevent a chain of abnormality of power storage device 20 in power storage module 10. Further, it is not necessary to separately provide an insulating material inside exhaust duct 45, and the number of parts can be reduced.

Furthermore, control device 56 can detect that heater 50 has ruptured. As a result, control device 56 can detect that at least one power storage device 20 is in an abnormal state in power storage module 10. With such a configuration, it is possible to prevent a chain of abnormality of power storage device 20 in power storage module 10.

Note that the present invention is not limited to the above-described exemplary embodiment and modified examples thereof, and it is a matter of course that various changes and improvements can be made within the scope of the matters described in the claims of the present application.

REFERENCE MARKS IN THE DRAWINGS

10 power storage module
15 housing
15A upper side part
20 power storage device
21 positive electrode
22 negative electrode
23 separator
24 electrode group
26 positive electrode lead
27 negative electrode lead
28 insulating plate
28A through-hole
29 insulating plate
30 battery case
31 outer covering can
31A opening
31B bottom part
32 sealing body
33 filter
33A through-hole
34 inner cap
35 insulating member
36 exhaust valve
37 cap
37A open part
39 gasket
40 case (housing)
40A upper side part
45 exhaust duct
50 heater
51 metal foil heater
52 base material
55 power source
56 control device
60 heat conductive material
70 current collector plate
71 positive electrode current collector member
72 negative electrode current collector member
75 insulating substrate
80 upper holder
80A container
80B opening
81 holding material
90 lower holder
90A container
91 holding material.

The invention claimed is:

1. A power storage module comprising:
a plurality of power storage devices;
a heater that heats the plurality of power storage devices;
a housing that houses the plurality of power storage devices and the heater;
an exhaust duct disposed on one side inside the housing and communicating with an outside of the housing; and
a holder that includes
a plurality of containers that house the plurality of power storage devices, respectively, and
a plurality of openings through which the plurality of containers communicate with an outer surface of the holder, wherein:
the heater includes a heating element configured to generate heat upon having electricity flowing through the heating element,
each of the plurality of power storage devices includes an exhaust unit that discharges a gas in the each of the plurality of power storage devices to an outside of the each of the plurality of power storage devices,
the exhaust duct is configured to receive the gas and exhaust the gas to the outside of the housing, and includes an upper face, which is a part of the housing, and a lower face closer to the plurality of power storage devices than the upper face,
the heating element is provided inside the exhaust duct to be exposed to the gas and is arranged closer to the lower face than the upper face of the exhaust duct, and is disposed above the exhaust unit of the each of the plurality of power storage devices,
the exhaust unit of the each of the plurality of power storage devices overlaps with corresponding one of the plurality of openings when viewed from above, the each of the plurality of openings is provided between the heating element and the corresponding one of the plurality of power storage devices, and a heat conductive material including an electrically insulating property is disposed inside the each of the plurality of openings, and the heating element is configured to break due to pressure of the gas discharged from the each of the plurality of power storage devices and allow the gas to pass through a portion of the heating element and the exhaust duct and discharged to the outside of the housing.

2. The power storage module according to claim 1, wherein the heating element ruptures when at least one of the plurality of power storage devices exhausts the gas.

3. The power storage module according to claim 2, wherein the heater includes a fragile part including a weaker mechanical strength than other parts of the heater.

4. The power storage module according to claim 2, further comprising a control device that detects rupture of the heating element when the heating element is ruptured.

5. The power storage module according to claim 1, wherein the heater further includes a base material covering the heating element, and the base material contains an insulating material.

6. The power storage module according to claim 1, wherein when at least one of the plurality of power storage devices discharges the gas, the gas passes through the each of the plurality of openings while rupturing the heat conductive material.

7. The power storage module according to claim 1, further comprising a current collector plate electrically connecting the plurality of power storage devices between the heating element and the holder, wherein:

the each of the plurality of power storage devices includes a first electrode and a second electrode, the current collector plate includes a first current collector member electrically connected to the first electrode, a second current collector member disposed side by side with the first current collector member and electrically connected to the second electrode, and a gap between the first current collector member and the second current collector member, and the heating element faces the gap.

8. The power storage module according to claim 1, wherein the heat conductive material is in direct contact with the heater.

9. The power storage module according to claim 1, wherein the heat conductive material is individually provided to each of the plurality of power storage devices.

10. The power storage module according to claim 5, wherein the heating element has a serpentine shape in plan view.

11. The power storage module according to claim 1, wherein:

the holder has an upper face constituting the lower face of the exhaust duct, the upper face of the holder is provided with the plurality of openings communicating with the plurality of containers, and the heating element is disposed on the lower face of the exhaust duct, and faces the each of the plurality of power storage devices through a corresponding one of the plurality of openings.

12. The power storage module according to claim 11, wherein the heating element passes through portions of the heater, and a corresponding one of the portions of the heating element faces the each of the plurality of power storage devices through the corresponding one of the plurality of openings.

13. The power storage module according to claim 1, wherein:

a mesh is provided in the corresponding one of the plurality of openings, and the mesh is configured to block emission matter discharged from the exhaust unit and to pass the gas discharged from the exhaust unit.

14. A power storage module comprising:

a plurality of power storage devices;

a heater that heats the plurality of power storage devices;

a housing that houses the plurality of power storage devices and the heater;

an exhaust duct disposed on one side inside the housing and communicating with an outside of the housing; and a holder that includes:

a plurality of containers that house the plurality of power storage devices, respectively, and a plurality of openings through which the plurality of containers communicate with an outer surface of the holder, wherein:

the heater includes a heating element configured to generate heat upon having electricity flowing through the heating element, each of the plurality of power storage devices includes an exhaust unit that discharges a gas in the each of the plurality of power storage devices to an outside of the each of the plurality of power storage devices, the exhaust duct is configured to receive the gas and exhaust the gas to the outside of the housing, and includes an upper face, which is a part of the housing, and a lower face closer to the plurality of power storage devices than the upper face, the heating element is provided inside the exhaust duct to be exposed to the gas and is arranged closer to the lower face than the upper face of the exhaust duct, and is disposed above the exhaust unit of the each of the plurality of power storage devices, the heating element overlaps with the plurality of openings when viewed from above, and the heating element is configured to break due to pressure of the gas discharged from the each of the plurality of power storage devices and allow the gas to pass through a portion of the heating element and the exhaust duct and discharged to the outside of the housing.

15. The power storage module according to claim 14, wherein the heating element ruptures when at least one of the plurality of power storage devices exhausts the gas.

16. The power storage module according to claim 15, wherein the heater includes a fragile part including a weaker mechanical strength than other parts of the heater.

17. The power storage module according to claim 15, further comprising a control device that detects rupture of the heating element when the heating element is ruptured.

18. The power storage module according to claim 14, wherein the heater further includes a base material covering the heating element, and the base material contains an insulating material.

19. The power storage module according to claim 14, wherein the exhaust unit of the each of the plurality of power storage devices overlaps with corresponding one of the plurality of openings when viewed from above.

20. The power storage module according to claim 14, further comprising a current collector plate electrically connecting the plurality of power storage devices between the heating element and each of the holder, wherein:

the each of the plurality of power storage devices includes a first electrode and a second electrode, the current collector plate includes a first current collector member electrically connected to the first electrode, a second current collector member disposed side by side with the first current collector member and electrically connected to the second electrode, and a gap between the first current collector member and the second current collector member, and the heating element faces the gap.

21. The power storage module according to claim 18, wherein the heating element has a serpentine shape in plan view.

22. The power storage module according to claim 14, wherein the holder has an upper face constituting the lower face of the exhaust duct, the upper face of the holder is provided with the plurality of openings communicating with the plurality of containers, and the heating element is disposed on the lower face of the exhaust duct, and faces the each of the plurality of power storage devices through a corresponding one of the plurality of openings.

23. The power storage module according to claim 22, wherein the heating element faces the exhaust unit of the each of the plurality of power storage devices through a corresponding one of the plurality of openings.

24. The power storage module according to claim 14, wherein a mesh is provided in the corresponding one of the plurality of openings, and the mesh is configured to block emission matter discharged from the exhaust unit and to pass the gas discharged from the exhaust unit.

25. The power storage module according to claim 18, wherein the heating element is a metal foil heater.

* * * * *